United States Patent Office 2,748,392
Patented June 5, 1956

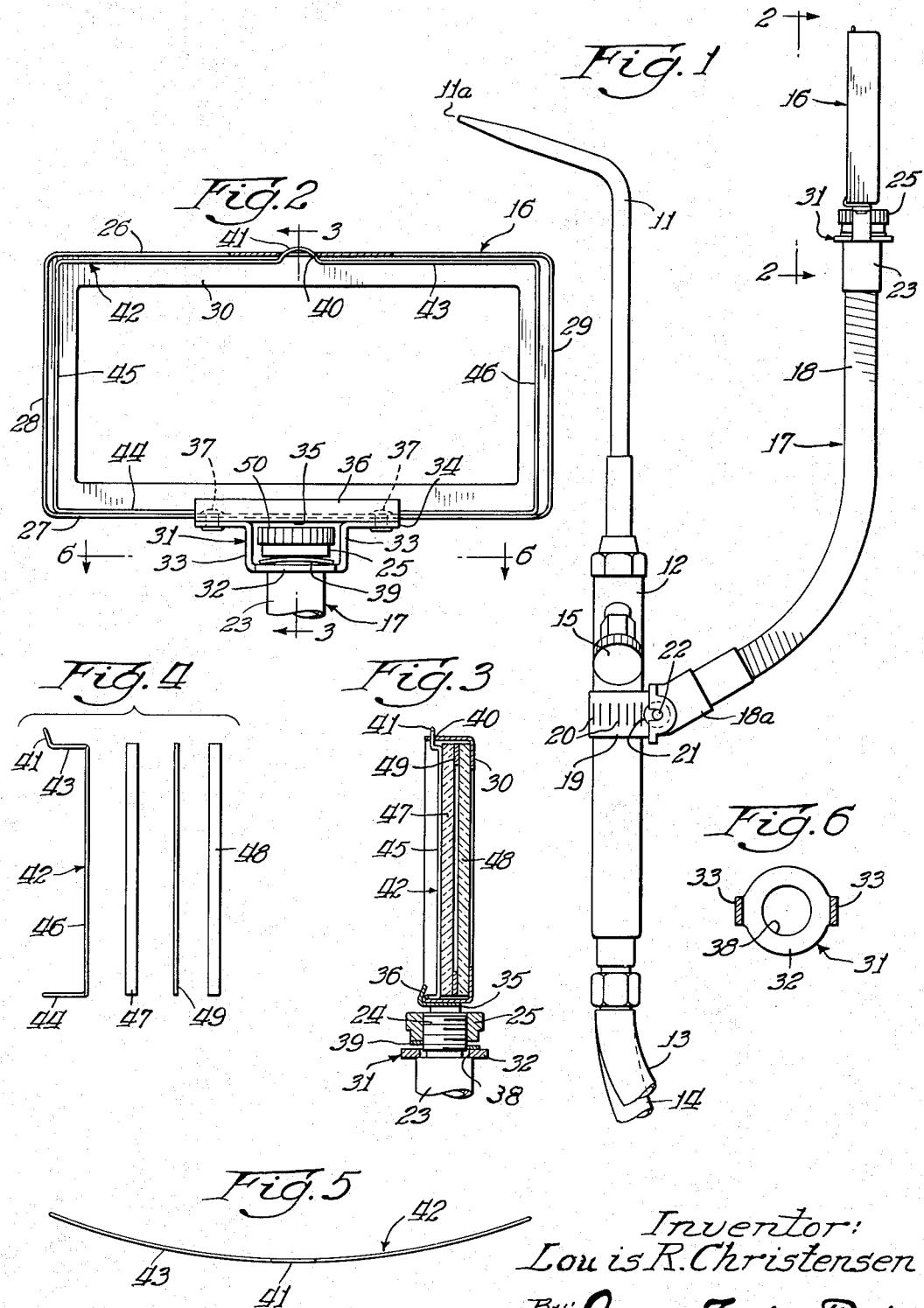

2,748,392

VIEWER DEVICE OR THE LIKE

Louis R. Christensen, Cicero, Ill.

Application May 2, 1955, Serial No. 505,138

2 Claims. (Cl. 2—8)

This invention relates to a viewer device or the like more particularly for use as a glare shield for a welding tool, the viewer being described as applied to that purpose.

Men engaged in welding find it necessary to wear goggles while doing so because of the intense glare radiated from the heated metals. It is impossible to look at these heated metals without some sort of protective lens. Goggles often become uncomfortable, and are annoying to many people. The present device has been designed for use in gas welding to eliminate the need for goggles, and to provide for more comfort and convenience.

The device increases the rate of production in that it eliminates time spent in setting the goggles to the face, raising and lowering them between operations, and again removing them.

Among other objects, the present invention aims to provide a device of this character that is simple in construction and adjustability and that can be manufactured in quantities at relatively low cost.

Important features of the present invention are the double adjustability of the device and ready replaceability of the glass panel or panels.

These and other objects and advantages will be apparent from the following description, taken together with the accompanying drawing, showing an illustrative embodiment of the invention, and in which drawings—

Figure 1 is a side elevational view showing the application of the viewer of the present invention to a welding tool;

Figure 2 is a front elevational view, somewhat enlarged, showing the viewer frame and the upper end of the support;

Figure 3 is a vertical sectional view taken on the line 3—3 of Fig. 2;

Figure 4 is a so-called exploded view showing glass panels, with an interposed gasket, and the wire for retaining them in the frame;

Figure 5 shows a top view of the retaining wire; and

Figure 6 is a cross-section, somewhat reduced, taken on the line 6—6 of Fig. 2, showing the stirrup.

Conventionally, a welding tool may include a torch member 11 backed by a nozzle 12 to which may be connected oxygen and acetylene tubes 13 and 14 respectively, the nozzle having one or more control valves 15.

In accordance with the present invention, which relates to the viewer embodying a frame 16 and support 17 therefor, the support 17 is in the form of a flexible but semi-rigid metal tubing 18 having at one end a fitting 18a that carries means for clamping it to the nozzle 12, such means being here shown as a hose clamp device comprising a metal band 19 having transverse slots 20 therein which is fixed at one end to the outer end of the fitting and after being wrapped around the nozzle is engaged by the worm 21 of a worm nut 22, the nut being rotatable to tighten the band on the nozzle, as is well known and need not be here further described.

Further in accordance with the present invention, at its other end the flexible tubing 18 carries a nipple 23 the termination of which is threaded as at 24 to have screwed thereonto the adjusting nut 25 when the frame 16 is secured to the support 17 as later described.

Turning now to the frame 16, the latter comprises four walls 26, 27, 28 and 29, the walls 26 and 27 constituting upper and lower walls respectively and the walls 28 and 29 side walls for the frame, the walls defining a four sided enclosure having a flange 30 extending therearound inwardly from the walls. The lower wall 27 carries centrally thereof a bracket 31 that includes a central annular stirrup 32 offset downwardly from the lower wall 27, legs 33 extending upwardly from the annular stirrup 32 and having their ends outwardly extended as at 34 to complete the bracket. Interposed between the leg ends 34 and the lower wall 27 of frame 16 is a plate-like member 35 that has an upturned or inturned edge 36 that projects into the frame enclosure somewhat parallel with the flange 30 but biased slightly toward the wall 27. The plate 35 is shown secured to the lower wall 27 by the rivets 37 that also secure the leg ends 34 to the frame.

When the frame 16 is mounted on the support 17 the threaded end 24 of the nipple 23 passes through the circular opening 38 in the annular stirrup 32 so that the threaded end projects into the space between the stirrup and the lower wall of the frame. Thereupon the adjusting nut 25 may be screwed onto the thread 24, and, preferably, disposed between the nut and the stirrup is a spring washer 39 that places a tension on the nut after a few turns thereof have been made.

Still further in accordance with the present invention, the upper wall 26 of the frame is slotted as at 40 to pass therethrough a projection, or, in this instance, a hump 41 of a springy retaining wire 42 that is generally rectangular shape and fits into the frame 16, the hump 41 being on the upper reach 43 of the wire, and the lower reach 44 of the wire being held in the frame by the turned in edge 36 of the plate 35, which thus provides a detent member for the wire. In order that the side reaches 45 and 46 of the wire shall bear snugly but resiliently against the flange 30 of the frame the wire is normally bowed as best seen in Fig. 5, the upper reach 43 and lower reach 44 being bowed toward the slot 40 and the edge 36.

Interposed within the frame 16 between the flange 30 of the frame and the side reaches 45 and 46 of the wire are in this instance a pair of glass panels 47 and 48, a rectangular gasket 49 being interposed between and around the contiguous edges of the glass panels. The outer glass panel 48 may be of ordinary and inexpensively replaceable glass while the inner panel 47 may be of a more expensive suitably colored glass that protects the eyesight of the one looking through the viewer at the oxy-acetylene flame issuing from mouth 11a of the torch 11, it being understood that the tool will be held so that the viewer device is interposed between the operator and the torch.

So constructed and arranged the viewer provides a two-way adjustment, that is to say, either by the ready flexing of the tube 18 to place the viewer in a proper position with respect to the torch to protect the eye of the operator, or by the adjusting nut 25, or both. Normally by reason of the spring washer 39 which imposes merely a frictional resistance to rotation of the frame on its axis, the angle of the frame 16 with respect to the axis of the support 17 may be readily changed without manipulating the nut 25 while at the same time the frame is held from casual displacement from such angle. If it be desired to secure the frame still further against angular displacement, the nut 25 may be tightened further to take up on the spring washer 39.

When it is desired to replace one or both of the glass panels 47 and 48, a slight pressure of the thumb or finger upon the humps 41 of the wire 42 to push it inwardly out of the slot 40 permits the wire to be readily removed from the frame and the glass panels freed. Upon replacement the wire is first located on the inner edge of the detent 36 and then the hump 41 is sprung into the slot 40.

The nut 25, as shown, is desirably cylindrical and has a knurled periphery 50 for convenience of manipulation.

While the device has been shown for illustrative purposes as applied to a glare shield for a welding tool, other uses and adaptations may be found. For example, the device might be adapted to a holder for a magnifying glass for reading purposes.

Such changes may be made as fall within the scope of the appended claims without departing from the invention.

What is here claimed is:

1. In a viewer device of the class embodying a glass holding frame and a support therefor, that improvement comprising upper, lower and side walls for the frame defining a four-sided enclosure, a flange extending inwardly from each wall, a U-shaped stirrup depending from said lower wall, said stirrup including an annulus part in a plane parallel with said frame lower wall downwardly offset from said lower wall and a pair of legs, outturned ends on said legs, a plate between said outturned ends and said lower wall, rivets passing through said plate and said legs respectively and secured to said lower wall, an upturned edge part on said plate projecting into said enclosure and inturned toward said flanges, a rectangular spring wire member received in said frame having its lower reach bowed toward said upturned edge part to abut said edge part, other of its reaches being urged thereby toward said flange, a hump in the wire upper reach, and a slot in said upper wall receiving said hump.

2. In a viewer device of the class embodying a glass holding frame and a support therefor, that improvement comprising upper, lower and side walls for the frame defining a four-sided enclosure, a flange extending inwardly from each wall, a U-shape stirrup depending from said lower wall, said stirrup including an annulus part in a plane parallel with the frame lower wall downwardly offset from said lower wall and a pair of upwardly extending legs, outturned ends on said legs, a plate between said outturned ends and said lower wall, means securing said plate, legs and lower wall together, an upturned edge part on said plate projecting into said enclosure, a rectangular spring wire member received in said frame having its lower reach bowed toward said upturned edge part to abut said edge, other of its reaches being urged thereby toward said flange, a hump in the wire upper reach, a slot in said upper wall receiving said hump, a connector having a threaded reduced end entered in said annulus, a nut screwed on said threaded end within said stirrup, and a spring washer between said nut and said annulus.

References Cited in the file of this patent
UNITED STATES PATENTS

| | | |
|---|---|---|
| 1,633,412 | Kelleher | June 21, 1927 |
| 2,260,849 | Bowers | Oct. 28, 1941 |
| 2,683,877 | Boltich | July 20, 1954 |